United States Patent [19]

Nielsen

[11] Patent Number: 5,812,398
[45] Date of Patent: Sep. 22, 1998

[54] METHOD AND SYSTEM FOR ESCROWED BACKUP OF HOTELLED WORLD WIDE WEB SITES

[75] Inventor: Jakob Nielsen, Atherton, Calif.

[73] Assignee: Sun Microsystems, Inc., Palo Alto, Calif.

[21] Appl. No.: 664,050

[22] Filed: Jun. 10, 1996

[51] Int. Cl.$^6$ .............................. H04B 3/30; G06F 11/00
[52] U.S. Cl. .................................. 364/285.1; 364/DIG. 1; 364/DIG. 2; 364/222.82; 364/962.1; 395/182.04; 380/25
[58] Field of Search ................................... 380/9, 30, 49; 364/285.1, 222.82, 962.1, 222.2, 222.5, 284.3, 284.4; 395/489, 200.09, 182.18, 182.04, 182.02, 187.01, 200.17, 200.02

[56] References Cited

U.S. PATENT DOCUMENTS

| | | | |
|---|---|---|---|
| 5,537,533 | 7/1996 | Staheli et al. | 395/182.03 |
| 5,550,984 | 8/1996 | Gelb | 395/200.17 |
| 5,574,906 | 11/1996 | Morris | 395/601 |
| 5,608,865 | 3/1997 | Midgely et al. | 395/180 |
| 5,613,012 | 3/1997 | Hoffman et al. | |
| 5,634,052 | 5/1997 | Morris | 395/601 |
| 5,659,704 | 8/1997 | Burkes et al. | 395/182.04 |

OTHER PUBLICATIONS

"Pegasus for Windows", Shareware, 1996.
*Using Netscape 2*, 2nd Edition, pp. 287, 330, 1995.

*Primary Examiner*—Stephen C. Buczinski

[57] ABSTRACT

Embodiments of the present invention provide an improved method and system for storing a backup copy of a client company's data. In the preferred embodiment, the backup of data occurs within a computer system having a host company's computer system and an escrow company's computer system. Through the teachings of the present invention, native data stored on a host computer is backed-up onto an escrow computer, even though the escrow company's computer system includes a security mechanism, such as a firewall, to prevent unauthorized access from computers outside the escrow company's computer system.

In one embodiment, the host computer stores a native copy of the data in a file. The host computer then processes the file, for example, using a computer program named "uuencode" which is found on many Unix-based computers, so as to convert the file into a format which can be emailed. Once converted, the host computer emails the file to the escrow computer. By emailing the file, the host computer is able to get the information in the file past the escrow company's firewall. The escrow computer receives the email, extracts the file from the email, and stores the file as a backup copy of the client company's data.

3 Claims, 6 Drawing Sheets

METHOD AND SYSTEM FOR ESCROWED BACKUP OF HOTELLED WORLD WIDE WEB SITES

FIELD OF THE INVENTION

The present invention relates to an improved method and system for storing a backup copy of data.

BACKGROUND OF THE INVENTION

Current methods and systems for backing up a client company's data are unable to adequately backup data from a client company's "web hotel". A web hotel is a website which is outsourced to a third party vendor. For example, assume a company wants to have a web site to promote its products. If the company is not technically oriented, they typically will not have the expertise to maintain their own web site. Therefore, they often outsource the responsibility for maintenance of their web site to a third party vendor.

Unfortunately, the servers at the third party vendor which store the data for the web site are sometimes inaccessible. The third party vendor may have its servers shut down for various reasons, including, financial trouble, technical breakdowns, or problems with the authorities in countries where approval is needed to be on the Internet.

When the server at the third party vendor is inaccessible a number of problems arise. First, the client company's customers are unable to access the client company's website and, therefore, the client's customers may think that the client company is unreliable. In other words, since it is transparent to the customer that the client company's website is hosted by a third party vendor, the customer will associate any technical problem with the website with the client company and not with the third party vendor. Second, the client company is losing potential sales to its customers because those customers are unable to place orders from the web site. In addition, the client company itself may not have any way to gain access to its own data as long as the server is inaccessible, and, therefore, may not be able to take measures to overcome the problems being experienced by the third party vendor. Since many less-technically oriented client companies choose to have their websites hosted on servers owned and operated by third party vendors, this problem is becoming increasingly important.

To overcome these deficiencies some client company's have instructed their third party vendors to backup their website data for safekeeping. There are many "backup" products available that can be used to generate extra copies of a website for safekeeping. Standard backup software makes copies directly from a server to a storage device attached to the server (e.g., a floppy disk for small backups or a magnetic tape for large backups). However, the third party vendors are only able to use these backup products to generate backup copies onto storage devices attached to the vendor's server. Obviously, such a backup copy is inaccessible to the client company anytime the vendor's server is also inaccessible to the client company. This type of backup system is inadequate because it fails to provide the client company with access to its data.

Another potential solution to the problem uses backup systems which make backups over a network (e.g., the product "Retrospect Remote" from Dantz). Performing the backup over the network allows a system administrator to set up an unattended backup of one computer from another computer on the same network. Unfortunately, client company's are unable to use such systems to provide themselves with access to a backup copy of their website data since most client companies have security measures in place (e.g., through a firewall product) which prevent such backup systems from storing backup data onto the client's computer system.

Embodiments of the present invention overcome the deficiencies of the prior art by providing an improved method and system for generating an escrowed backup of a client's data.

SUMMARY OF THE INVENTION

Embodiments of the present invention provide an improved method and system for storing a backup copy of a client company's data. In the preferred embodiment, the backup of data occurs within a computer system having a host company's computer system and an escrow company's computer system. Through the teachings and suggestions of the present invention, native data stored on a host computer is backed-up onto an escrow computer, even though the escrow company's computer system includes a security mechanism, such as a firewall, to prevent unauthorized access from computers outside the escrow company's computer system.

In a first embodiment, the host computer stores a native copy of the data in a file. The host computer then processes the file, for example, using a computer program named "uuencode" which is found on many Unix-based computers, so as to convert the file into a format which can be emailed. Once converted, the host computer emails the file to the escrow computer. By emailing the file, the host computer is able to get the information in the file past the escrow company's firewall. The escrow computer receives the email, extracts the file from the email, and stores the file as a backup copy of the client company's data.

A second embodiment of the invention extends the functionality of the first embodiment by enhancing the client company's ability to safeguard its privacy interest in the data. In this embodiment the host computer encrypts the file, for example using a public key/private key encryption method, before emailing the file to the escrow computer. In this way, the escrow company is able to store the file for safekeeping but is not able to decrypt the file without first obtaining the "private key" for the data from the client company.

A third embodiment of the invention provides an improved method and system for storing multiple backup copies of data. The escrow computer system preferably stores the last three backups of the data. Backups that are more than three backup periods old are treated as follows: if the backup period for the file is a power of two (e.g., 4, 8, 16, etc.), then it continues to be stored by the escrow computer system. If the backup period is not a power of two then the file is kept if there are no other files stored with a period number greater than the file in question but smaller than the next higher power of two. Thus, if the file being considered is 6 backup periods old, it will be deleted if there is a file that is 7 periods old and kept if there is no such file. This approach ensures that there are always backup files available to restore past system states, though progressively fewer files are kept for older states (that are less likely to need to be restored exactly).

This method for maintaining backup copies of data is especially useful in an environment where a client company's web site is being maintained by an outside agency and where the outside agency uses an embodiment of the present invention for maintaining backup copies of the data. This is true because the host company may begin to forward inaccurate or corrupt backup copies of the web site to the escrow company before the host company's computers become completely inaccessible, for example, due to the host company's bankruptcy. Therefore, it is important to maintain multiple backup copies of data to ensure that an accurate copy of the website may eventually be restored.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

BRIEF DESCRIPTION OF THE DRAWINGS

It should be noted that like reference numerals refer to corresponding parts throughout the several views of the drawings.

DETAILED DESCRIPTION

Overview Of The Preferred Method

Embodiments of the present invention provide an improved method and system for storing a backup copy of a client's data. In the preferred embodiment, the backup of data occurs within a computer system having a host company's computer system and an escrow company's computer system. Through the teachings and suggestions of the present invention, data stored on a host computer is backed-up onto an escrow computer, even though the escrow company's computer system includes a security mechanism, such as a firewall, to prevent unauthorized access from computers outside the escrow company's computer system.

In one embodiment, the host computer stores a copy of the data in a file. The host computer then encrypts the file, for example using a public key/private key encryption method. The host computer then processes the encrypted file, for example, using a computer program named "unencode" which is found on many Unix-based computers, so as to convert the file into a format which can be emailed. Once converted and encrypted, the host computer emails the file to the escrow computer. By emailing the file, the host computer is able to get the information in the file past the escrow company's firewall. The escrow computer receives the email, extracts the file from the email, and stores the file as a backup copy of the client's data. Because the file is encrypted, the escrow company is able to store the file for safekeeping but is not able to decrypt the file without first obtaining the "private key" for the data from the client company. In this way, the client company's privacy rights in the data are further safeguarded.

Overview Of The Preferred System

Figure 1:
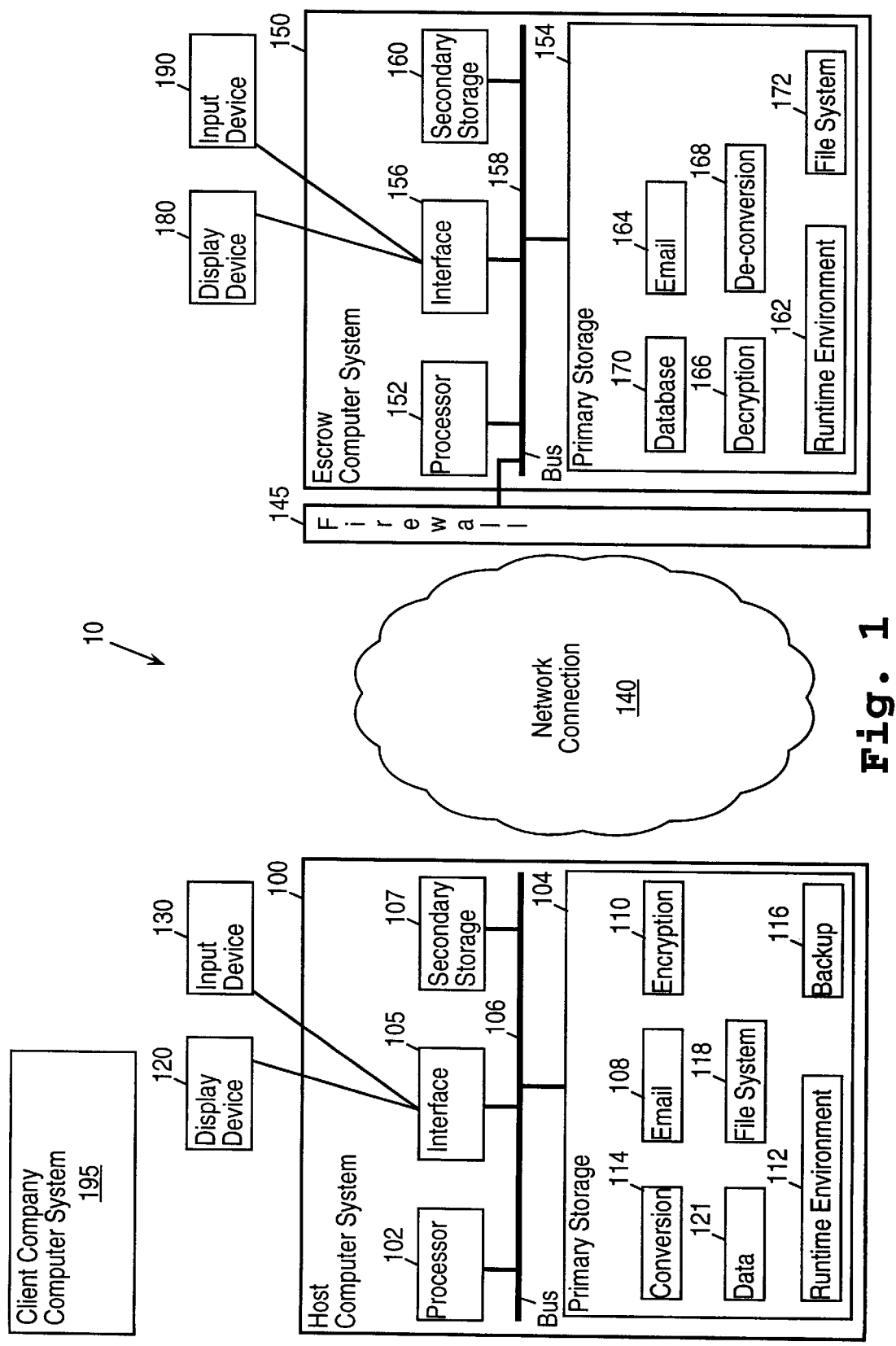
FIG. 1 is a block diagram which is illustrative of a computer network for executing various embodiments of the present invention.

FIG. 1 is a block diagram which is illustrative of a computer network for executing various embodiments of the present invention. Most computer systems in use today are generally of the structure shown in FIG. 1. Host computer system 100 includes a processor 102 which fetches computer instructions from a primary storage 104 through an interface 105, such as an input/output subsystem; connected to bus 106. Processor 102 executes the fetched computer instructions. In executing computer instructions fetched from primary storage 104, processor 102 can retrieve data from or write data to primary storage 104, display information on one or more computer display devices 120, receive command signals from one or more user-input devices 130, or transfer data to secondary storage 107 or even other computer systems which collectively form the computer network 10 (such as escrow computer system 150). Processor 102 can be, for example, any of the SPARC processors available form Sun Microsystems, Inc. of Mountain View, Calif. or any processors compatible therewith. Primary storage 104 can include any type of computer primary storage including, without limitation, randomly accessible memory (RAM), read-only memory (ROM), and storage devices which include magnetic and optical storage media such as magnetic or optical disks. Computer display devices 120 can include, for example, printers and computer display screens such as cathode-ray tubes (CRTs), light-emitting diode (LED) displays, and liquid crystal displays (LCDs). User-input devices 130 can include without limitation electronic keyboards and pointing devices such as electronic mice, trackballs, lightpens, thumbwheels, digitizing tablets, and touch sensitive pads.

Computer system 100 can be, e.g., any of the SPARCstation workstation computer systems available form Sun Microsystems, Inc. of Mountain View, Calif., any other Macintosh computer systems based on the PowerPC processor and available from Apple Computers, Inc. of Cuptertino, Calif., or any computer system compatible with the IBM PC computer systems available form International Business Machines, Corp of Somers, N.Y., which are based on the X86 series of processors available from Intel Corporation or compatible processors. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Also executing within processor 102 from primary storage 104 is a runtime environment 112. Runtime environment 112 is generally a set of computer programs which enable computer system 100 to understand and process commands, control input and output of computers system 100 through user-input devices 130 and computer display devices 120, schedule computer processes for execution, manage data stored in various storage devices of primary storage 104 of computer system 100, and control the operation of other peripheral devices (not shown) coupled to computer system 100. In some embodiments of the invention, the runtime environment 112 is embodied as an operating system or an operating system with a kernel. The kernel of an operating system is that portion of the operating system which manages the interface between computer processes (e.g., email process 108, encryption process 110, conversion process 114, and backup process 116) and user-input devices 130 and computer display devices 120, manages primary storage 104, schedules computer process for execution, and maintains a file system 118 which in turn manages storage of data 120 on various storage devices of primary storage 104. In some embodiments, the kernel is the only part of the operating system which interacts with the hardware components of computer system 100.

Computer network 10 also includes a network connection 140 for facilitating communication between host computer system 100 and escrow computer system 150. Network connection 140 can be any well know mechanism for facilitating communication between computers, such as, without limitation, a local area network, a wide area network, the Internet, or any of the well known wireless communication systems. In the preferred embodiment, a firewall 145 sits between the network connection 140 and the escrow computer system 150. The firewall 145 prohibits unauthorized access to the escrow computer system from the computer network 10.

Escrow computer system 150 is typically of similar structure to host computer system 100. Escrow computer system 150 includes a processor 152 which fetches computer instructions from a primary storage 154 through an interface 156, such as an input/output subsystem, connected to bus 158. Processor 152 executes the fetched computer instructions. In executing computer instructions fetched from primary storage 154, processor 152 can retrieve data from or write data to primary storage 154, display information on one or more computer display devices 180, receive command signals from one or more user-input devices 190, or transfer data to secondary storage 160 or even other computer systems which collectively form the computer network 10 (such as escrow computer system 100). Processor 152 can be, for example, any of the SPARC processors available form Sun Microsystems, Inc. of Mountain View, Calif. or any processors compatible therewith. Primary storage 154 can include any type of computer primary storage including, without limitation, randomly accessible memory (RAM), read-only memory (ROM), and storage devices which include magnetic and optical storage media such as magnetic or optical disks. Computer display devices 180 can include, for example, printers and computer display screens such as cathode-ray tubes (CRTs8O can include without limitation electronic keyboards and pointing devices such as electronic mice, trackballs, lightpens, thumbwheels, digitizing tablets, and touch sensitive pads.

Computer system 150 can be, e.g., any of the SPARCstation workstation computer systems available form Sun Microsystems, Inc. of Mountain View, Calif., any other Macintosh computer systems based on the PowerPC processor and available from Apple Computers, Inc. of Cuptertino, Calif., or any computer system compatible with the IBM PC computer systems available form International Business Machines, Corp of Somers, N.Y., which are based on the X86 series of processors available from Intel Corporation or compatible processors. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Also executing within processor 152 from primary storage 154 is a runtime environment 162. Runtime environment 162 is generally a set of computer programs which enable computer system 150 to understand and process commands, control input and output of computers system 150 through user-input devices 190 and computer display devices 180, schedule computer processes for execution, manage data stored in various storage devices of primary storage 154 of computer system 150, and control the operation of other peripheral devices (not shown) coupled to computer system 150. In some embodiments of the invention, the runtime environment 162 is embodied as an operating system or an operating system with a kernel. The kernel of an operating system is that portion of the operating system which manages the interface between computer processes (e.g., email process 164, decryption process 166, de-conversion process 168, and database 170) and user-input devices 190 and computer display devices 180, manages primary storage 154, schedules computer process for execution, and maintains a file system 172 which in turn manages storage of data in database 170. In some embodiments, the kernel is the only part of the operating system which interacts with the hardware components of computer system 150.

It should be noted that client computer system 195 is not operatively connected to either host computer system 100 or escrow computer system 150.

Preferred Steps Of A Specific Embodiment

FIGS. 2–6 illustrate the preferred steps to be performed in one illustrative embodiment of the present invention for providing an improved method for storing a backup copy of a client's data. The flowcharts described herein are illustrative of merely the broad logical flow of steps to achieve a method of the present invention and that steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flow chart may dictate changes in the selection and order of steps.

In general, the flowcharts in this specification include one or more steps performed by software routines executing in a computer system. The routines may be implemented by any means as is known in the art. For example, any number of computer programming languages, such as Java, C, C++, Pascal, FORTRAN, assembly language, etc., may be used. Further, various programming approaches such as procedural, object oriented or artificial intelligence techniques may be employed.

Figure 2:
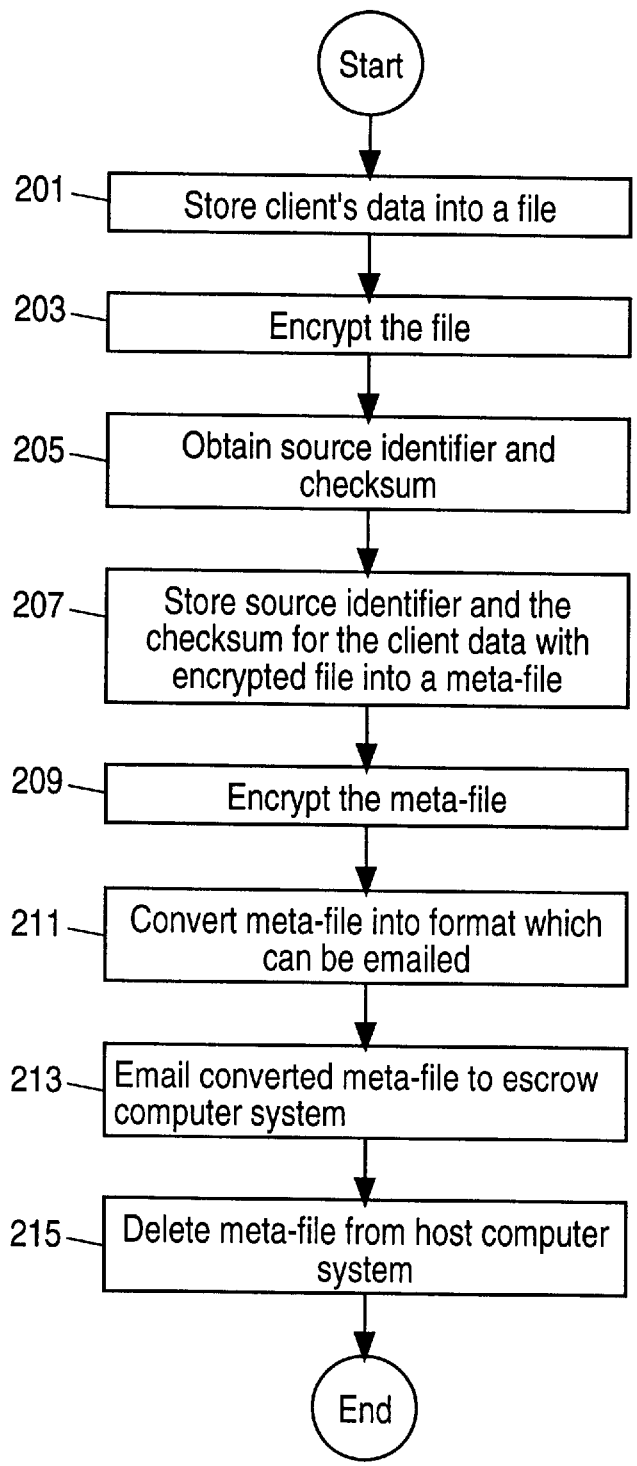
FIG. 2 is an overview flow diagram of the preferred steps for storing a backup copy of the client's data into a converted meta-file which can be emailed to the escrow computer system for storage.

FIG. 2 is an overview flow diagram of the preferred steps for storing a backup copy of the client's data into a converted meta-file which can be emailed to the escrow computer system for storage. The steps of FIG. 2 are typically initiated by a background process which accesses a "cron" file on a periodic basis and executes a backup routine indicated in the cron file. A cron file maintains a list of routines that should be run by the computer maintaining the cron file. Typically, the cron file also contains an indication of when each routine should be run by the computer. So, for example, the cron file maintained by the file system 118 of the host computer system 100 may contain an entry which indicates that the backup routine should be run at specified intervals. The preferred time to run the backup routine is once per week during a period of low-load for the system. The best time to run the routine, however, will vary from organization to organization. For example, highly time sensitive information should most likely be backed-up more than once per week.

In step 201 the backup process stores the client's data into a file. In the preferred embodiment, the data to be stored is a set of data which collectively comprises a client company's web site. The client's web site is often a collection of hypertext documents and scripts (e.g., CGI scripts). The preferred routine used to store the set of data into one file is the "tar" routine. Those of ordinary skill will understand that other routines could be used to serve the same purpose as the tar routine. Table 1 sets forth more information on the tar routine.

Page: 13
TABLE 1 tar(1)  User Commands  tar(1)

NAME tar - create tape archives, and add or extract files

SYNOPSIS

/usr/sbin/tar c [ bBefFhilvwX [ 0-7 ]] [ device ] [ block ]

[ exclude-filename ... ] [ -I include-filename ]

filename ...  [ -C directory filename ]

/usr/sbin/tar r [ bBefFhilvw [ 0-7 ]] [ device ] [ block ]

[ -I include-filename ] filename ...

[ -C directory filename ]

/usr/sbin/tar t [ BefFhilvX [ 0-7 ]] [ device ]

[ exclude-filename ... ] [ -I include-filename ]

[ filename ... ]

/usr/sbin/tar u [ bBefFhilvw [ 0-7 ]] [ device ] [ block ]

filename ...

/usr/sbin/tar x [ BefFhilmopvwX [ 0-7 ]] [ device ]

[ exclude-filename ... ] [ filename ... ]

P1257.5/29/96(ks)

Page: 14

DESCRIPTION tar archives and extracts files to and from a single file called a tar file. A tarfile is usually a magnetic tape, but it can be any file. tar's actions are controlled by the key argument. The key is a string of characters containing exactly one function letter (c, r, t, u, or x) and one or more function modifiers, depending on the function letter used. Other arguments to the command are filenames (or directory names) specifying which files are to be archived or extracted. In all cases, appearance of a directory name refers to the files and (recursively) subdirectories of that directory.

FUNCTION LETTERS

The function portion of the key is specified by one of the following letters:

c   Create. Writing begins at the beginning of the tarfile, instead of at the end. This key implies the r key.

r   Replace. The named filenames are written on the end of the tape. The c and u functions imply this function. See NOTES for more information.

t   Table of Contents. The names of the specified files are listed each time they occur on the tarfile. If no filenames arguments are given, all the names on the tarfile are listed. With the v function modifier, additional information for the specified files is displayed. The listing is similar to the format produced by the ls -l command.

u   Update. The named filenames are added to the tarfile if they are not already there, or have been modified since last written on that tarfile. This key implies the r key. See NOTES for more information.

P1257.5/29/96(ks)

Page: 15 x     Extract, or restore. The named filenames are extracted from the tarfile and written to the current directory. If a named file matches a directory whose contents had been written onto the tarfile, this directory is (recursively) extracted. Use the file or directory's relative path when appropriate, or tar will not find a match. The owner, modification time, and mode as restored (if possible). If no filenames argument is given, the entire content of the tarfile is extracted. Note: If several files with the same name are on the tarfile, the last one overwrites all earlier ones. See NOTES for more information.

FUNCTION MODIFIERS

The characters below may be used in addition to the letter that selects the desired function. Use them in the order shown in the SYNOPSIS.

b     Blocking Factor. This causes tar to use the block argument as the blocking factor for tape records. The default is 1, the maximum is 20. This function should not be supplied when operating on regular archives or block special devices. It is mandatory however, when reading archives on raw magnetic tape archives (see f below). The block size is determined automatically when reading tapes created on block special devices (key letters x and t). This determination of the blocking factor may be fooled when reading from a pipe or a socket (see the B key letter below). The maximum blocking factor is determined only by the amount of memory available to tar when it is run. Larger blocking factors result in better throughput, longer blocks on nine-tracktapes, and better media utilization.

B     Block. Force tar to perform multiple reads (if necessary) so as to read exactly enough bytes to fill a block. This option exists so that tar can work across the Ethernet, since pipes and sockets return partial blocks even when more data is coming.

Page: 16 e     Error. If any unexpected errors occur tar will exit immediately with a positive exit status.

f     File. This causes tar to use the device argument as the name of the tarfile. If f is omitted, tar will use the device indicated by the TAPE environment variable, if set. Otherwise, it will use the default values defined in /etc/default/tar. If the name of the tarfile is '-', tar writes to the standard output or reads from the standard input, which-ever is appropriate. Thus, tar can be used as the head or tail of a pipeline. tar can also be used to move hierarchies with the command example% cd fromdir; tar cf - . | (cd todir; tarxfBp -)

F     With one F argument, tar will exclude all directories named SCCS from the tarfile. With two arguments, FF, tar will exclude all directories named SCCS, all files with .o as their suffix, and all files named errs, core, and a.out.

h     Follow symbolic links as if they were normal files or directories. Normally, tar does not follow symbolic links.

i     Ignore. With this option tar will ignore directory checksum errors.

l     Link. This tells tar to complain if it cannot resolve all of the links to the files being archived. If l is not specified, no error messages are printed.

m     Modify. This tells tar to not extract the modification times from the tarfile. The modification time of the file will be the time of extraction. This option is only valid with the x key.

P1257.5/29/96(ks)

Page: 17 o  Ownership. This causes extracted files to take on the user and group identifier of the user running the program, rather than those on tape. This happens by default for users other than root. If the 'o' option is not set and the user is root, the extracted files will take on the group and user identifiers of the files on tape (see chown(1) for more information). The 'o' option is only valid with the x key.

p  Restore the named files to their original modes, ignoring the present umask(2). Set UID and sticky information are also extracted if your are the super-user. This option is only useful with the x key letter.

v  Verbose. Normally, tar does its work silently. This option causes tar to type the name of each file it treats, preceded by the function letter. With the t function, v gives more information about the tape entries than just the name.

w  What. This option causes tar to print the action to be taken, followed by the name of the file, and then wait for the user's confirmation. If a word beginning with y is given, the action is performed. Any other input means no. This is not valid with the t key.

X  Exclude. Use the exclude-filename argument as a file containing a list of named files (or directories) to be excluded from the tarfile when using the key letters c, x, or t. Multiple X arguments may be used, with one exclude-filename per argument. See NOTES for more information.

[0-7]  Select an alternative drive on which the tape is mounted. The default is specified in /etc/default/tar. If a file name is preceded by - I then the filename is opened. A list Page: 18 lfilenames, one per line, is treated as if each appeared separately on the command line. Be careful of trailing white space in both include and exclude file lists.

In the case where excluded files (see X option) also exist, excluded files take precedence over all included files. So, if a file is specified in both the include and exclude files
(or on the command line), it will be excluded. If a file name is preceded by - C in a c (create) or r (replace) operation, tar will perform a chdir (see csh(1)) to that file name. This allows multiple directories not related by a close common parent to be archived using short relative path names. Note: the -C option only applies to one following directory name and one following file name.

EXAMPLES

To archive files from /usr/include and from /etc, onto default tape drive 0 one might use:

example% tar c -C /usr include -C /etc.

If you get a table of contents from the resulting tarfile, you might see something like:
include/
include/a.out.h and all the other files in /usr/include ...
/chown
and all the other files in /etc
To extract all files under include:
example% tar xv include
x include/, 0 bytes, 0 tape blocks P1257.5/29/96(ks)

Page: 19 and all files under include...

Here is a simple example using tar to create an archive of your home directory on a tape mounted on drive /dev/rmt/0:

example% cd example% tar cvf /dev/rmt/0 .

messages from tar

The c option means create the archive; the v option makes tar tell you what it is doing as it works; the f option means that you are specifically naming the file onto which the archive should be placed (/dev/rmt/0 in this example).

Now you can read the table of contents from the archive like this:

example% tar tvf /dev/rmt/0 rw-r--r-- 1677/40 2123 Nov 7 18:15 1985    ./test.c

...

example%

The columns have the following meanings:

o column 1 is the access permissions to ./test.c o column 2 is the user-id/group-id of ./test.c o column 3 is the size of ./test.c in bytes o column 4 is the modification date of ./test.c o column 5 is the name of ./test.c P1257.5/29/96(ks)

Page: 20

You can extract files from the archive like this:

example% tar xvf /dev/rmt/0 messages from tar example%

If there are multiple archive files on a tape, each is separated from the following one by an EOF marker. tar does not read the EOF mark on the tape after it finishes reading an archive file because tar looks for a special header to decide when it has reached the end of the archive. Now if you try to use tar to read the next archive file from the tape, tar does not know enough to skip over the EOF mark and tries to read the EOF mark as an archive instead. The result of this is an error message from tar to the effect:

tar: blocksize=0

This means that to read another archive from the tape, you must skip over the EOF marker before starting another tar command. You can accomplish this using the mt(1) command as shown in the example below. Assume that you are reading from /dev/rmt/0n. example% tar xvfp /dev/rmt/0n read first archive from tape messages from tar example% mt fsf 1 skip over the end-of-file marker example% tar xvfp /dev/rmt/0n read second archive from tape messages from tar example%

Finally, here is an example using tar to transfer files across the Ethernet. First, here is how to archieve files from the local machine (example) to a tape on a remote system (host):

example% tar cvfb - 20 filenames|

Page: 21

```
rsh host dd of=/dev/rmt/0 obs=20b
messages from tar
example%
```

In the example above, we are creating a tarfile with the c key letter, asking for verbose output from tar with the v option, specifying the name of the output tarfile using the f option (the standard output is where the tarfile appears, as indicated by the `-' sign), and specifying the blocksize (20) with the b option. If you want to change the blocksize, you must change the blocksize arguments both on the tar command and on the dd command.

Now, here is how to use tar to get files from a tape on the remote system back to the local system:

```
example% rsh -n host dd if=/dev/rmt/0 bs=20b |
    tar xvBfb - 20 filenames
messages from tar
example%
```

In the example above, we are extracting from the tarfile with the x key letter, asking for verbose output from tar with the v option, telling tar it is reading from a pipe with the B option, specifying the name of the input tarfile using the f option (the standard input is where the tarfile appears, as indicated by the `-' sign), and specifying the blocksizes (20) with the b option.

ENVIRONMENT

If any of the LC_* variables ( LC_CTYPE, LC_MESSAGES, LC_TIME, LC_COLLATE, LC_NUMERIC, and LC_MONETARY) (see environ(5)) are not set in the environment, the operational behavior of tar for each corresponding locale category is determined P1257.5/29/96(ks)

Page: 22 by the value of the LANG environment variable. If LC_ALL is set, its contents are used to override both the LANG and the other LC_* variables. If none of the above variables is set in the environment, the "C" (U.S. style) locale determines how tar behaves.

LC_CTYPE

Determines how tar handles characters. When LC_CTYPE is set to a valid value, tar can display and handle text and filenames containing valid characters for that locale. tar can display and handle Extended Unix code (EUC) characters where any individual character can be 1, 2, or 3 bytes wide. tar can also handle EUC characters of 1, 2, or more column widths. In the "C" locale, only characters from ISO 8859-1 are valid.

LC_MESSAGES

Determines how diagnostic and informative messages are presented. This includes the language and style of the messages, and the correct form of affirmative and negative responses. In the "C" locale, the messages are presented in the default form found in the program itself (in most cases, U.S. English).

FILES

/dev/rmt/[0-7][b][n]
/dev/rmt/[0-7]l[b][n]
/dev/rmt/[0-7]m[b][n]
/dev/rmt/[0-7]h[b][n]
/dev/rmt/[0-7]u[b][n]
/dev/rmt/[0-7]c[b][n]
/etc/default/tar P1257.5/29/96(ks)

Page: 23

/tmp/tar*

SEE ALSO ar(1), chown(1), cpio(1), csh(1), ls(1), mt(1), umask(2), environ(5)

DIAGNOSTICS

Complaints about bad key characters and tape read/write errors. Complaints if enough memory is not available to hold the link tables.

The b option should not be used with archives that are going to be updated. The current magnetic tape driver cannot backspace raw magnetic tape. If the archive is on a disk file, the b option should not be used at all, because updating an archive stored on disk can destroy it.

Neither the r option nor the u option can be used with quarter-inch archive tapes, since these tape drives cannot backspace.

When extracting tapes created with the r or u option, directory modification times may not be set correctly.

When using r, u, x, or X, the named files must match exactly to the corresponding files in the tarfile. For example, to extract./filename, you must specify./filename, and not filename. The t option displays how each file was archived.

The current limit on file name length is 100 characters.

tar does not copy empty directories or special files such as devices.

P1257.5/29/96(ks)

Page: 24

Filename substitution wildcards do not work for extracting files from the archive. To get around this, use a command of the form:

tar xvf... /dev/rmt/0 `tar tf... /dev/rmt/0 | grep 'pattern'`

End of Table 1

Figure 3A:
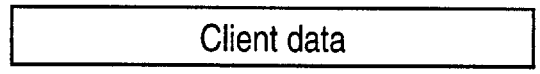
FIG. 3a depicts client data used with various embodiments of the present invention.
Figure 3B:
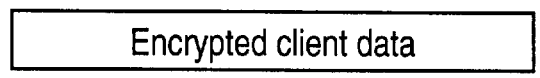
FIG. 3b depicts an encrypted version of the client data for used with various embodiments of the present invention.
Figure 3C:
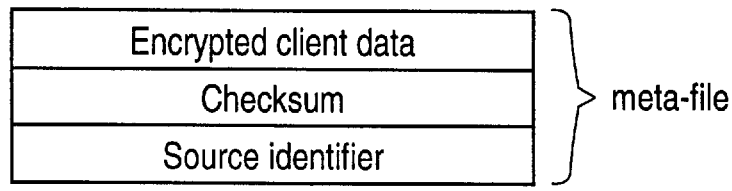
FIG. 3c depicts a meta-file for use with various embodiments of the present invention.
Figure 3D:
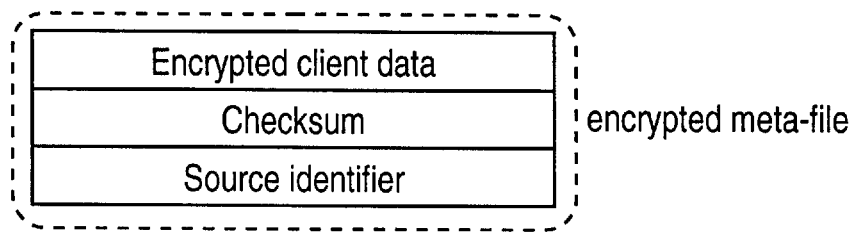
FIG. 3d depicts an encrypted version of the meta-file for use with various embodiments of the present invention.

In step 203 the backup routine encrypts the file containing the client's data (see, FIGS. 3A and 3B). In step 205 the backup routine obtains an identifier for the source of the encrypted file (e.g., a digital signature for the host computer system) and performs a checksum operation on the encrypted file. In step 207 the routine then stores the source identifier and the result from the checksum operation with the encrypted file to create a meta-file (see, FIG. 3C). Finally, the routine encrypts the meta-file (step 209). By encrypting the client data and the meta-file using the preferred steps discussed below, user's of this method can adequately assure that the escrow computer can 1) verify that the host computer has sent it the client's data, 2) that the client's data was not tampered with enroute to the escrow computer, while 3) still being unable to decrypt the client's data, thus providing added security to the client.

As discussed above, the method and system of the present invention involves the encryption and decryption of certain information. In the preferred embodiment of the present invention, two public key encryption schemes are used to carry out steps 203 and 209 of FIG. 2. With a publickey system, two different keys are used for encrypting and decrypting information. In this system, one key is public and the other key is private. Information that is encrypted with one key can be decrypted with the other key. A public-key system is sometimes referred to as an asymmetric-key or a two-key system. As used herein, a public-key and a private-key refer to the two keys in a public-key system. In the preferred embodiment of the present invention, the public-key systems are based on the well-known RSA algorithm. A discussion of the RSA algorithm is found in U.S. Pat. No. 4,405,829 to Rivest et al., which is incorporated herein by reference. However, one of ordinary skill in the art will appreciate that other public-key systems could be used.

Using the public-key schemes, one computer (e.g., the host computer) encrypts information (e.g., the client data) using the other computer's (e.g., the client computer's) public-key and only the other computer (e.g., the client computer) can decrypt the information using that computer's (e.g., the client computer's) private-key.

In addition, one computer (e.g., the host computer) also encrypts additional information (such as a source identifier or a digital signature) using the computer's (e.g., the host computer's) private -key and another computer (e.g., the escrow computer) decrypts the information using the first computer's (e.g., the host computer's) public-key. In this situation, the source of the information is ensured because only the first computer (e.g., the host computer) should be able to encrypt information that can be decrypted using that computer's (e.g., the host computer's) public-key.

While the discussion above has focused exclusively on public key and private key encryption schemes, those of ordinary skill in this area of computer science will understand that other encryption schemes may be substituted therefore. For example, a secret key encryption scheme can be used to provide for secure transmission of the backup data. With a secret-key system, a single key is used for both encrypting and decrypting information. A secret-key system is sometimes referred to as a private-key, a symmetric-key or a single-key system. The secret-key system can be used by the host computer to encrypt certain information so that no one but the client computer can understand it.

Although this discussion has stated that the secrecy and the source of the information are ensured through the above steps, encryption schemes are never completely secure. The security of encryption schemes can be compromised if the secret-key (in a secret-key system) or the private-key (in a public-key system) becomes known to a computer that is not the owner of the key.

Returning to the discussion of FIG. 2, in step 211, the backup routine converts the meta-file into a format which can be emailed across the network connection 140 to the escrow computer system 150. In the preferred embodiment the backup routine executes the "uuencode" command to accomplish this task. Table 2, below, provides more information on the uuencode command. Those of ordinary skill in this area of computer science will understand that other commands could be executed to accomplish the desired results.

In step 213, the backup routine emails the converted meta-file to the escrow computer system. Using this technique, the host computer is able to get the client's backup data past the escrow computer system's firewall 145. In step 215, the host computer system deletes the meta-file from the host computer system.

TABLE 2 uuencode(1C)    Communication Commands    uuencode(1C)
NAME
    uuencode, uudecode - encode a binary file, or decode its
    ASCII representation
SYNOPSIS
    uuencode [source-file] file-label
    uudecode [encoded-file]
AVAILABILITY
    SUNWesu
DESCRIPTION
    uuencode converts a binary file into an ASCII-encoded
representation that can be sent using mail(1). It encodes the contents of
source-file, or the standard input if no source-file argument is given. The
file-label argument is required. The file-label is included in the encoded
file's header as the name of the file into which uudecode is to place the
binary (decoded) data. uuencode also includes the ownership and permission modes of source-file, so that file-label is recreated with those
same ownership and permission modes.
    uudecode reads an encoded-file, strips off any leading and
trailing lines added by mailer programs, and recreates the original binary
data with the filename and the mode and owner specified in the header.
    The encoded file is an ordinary ASCII text file; it can be
edited by any text editor. But it is best only to change the mode or file-label in the header to avoid corrupting the decoded binary.
SEE ALSO
    mail(1), uucp(1C), uux(1C)
NOTES
    The encoded file's size is expanded by 35% (3 bytes become
4, plus control information), causing it to take longer to transmit than the
equivalent binary.
    The user on the remote system who is invoking uudecode
(typically uucp) must have write permission on the file specified in the
file-label.

Figure 4:
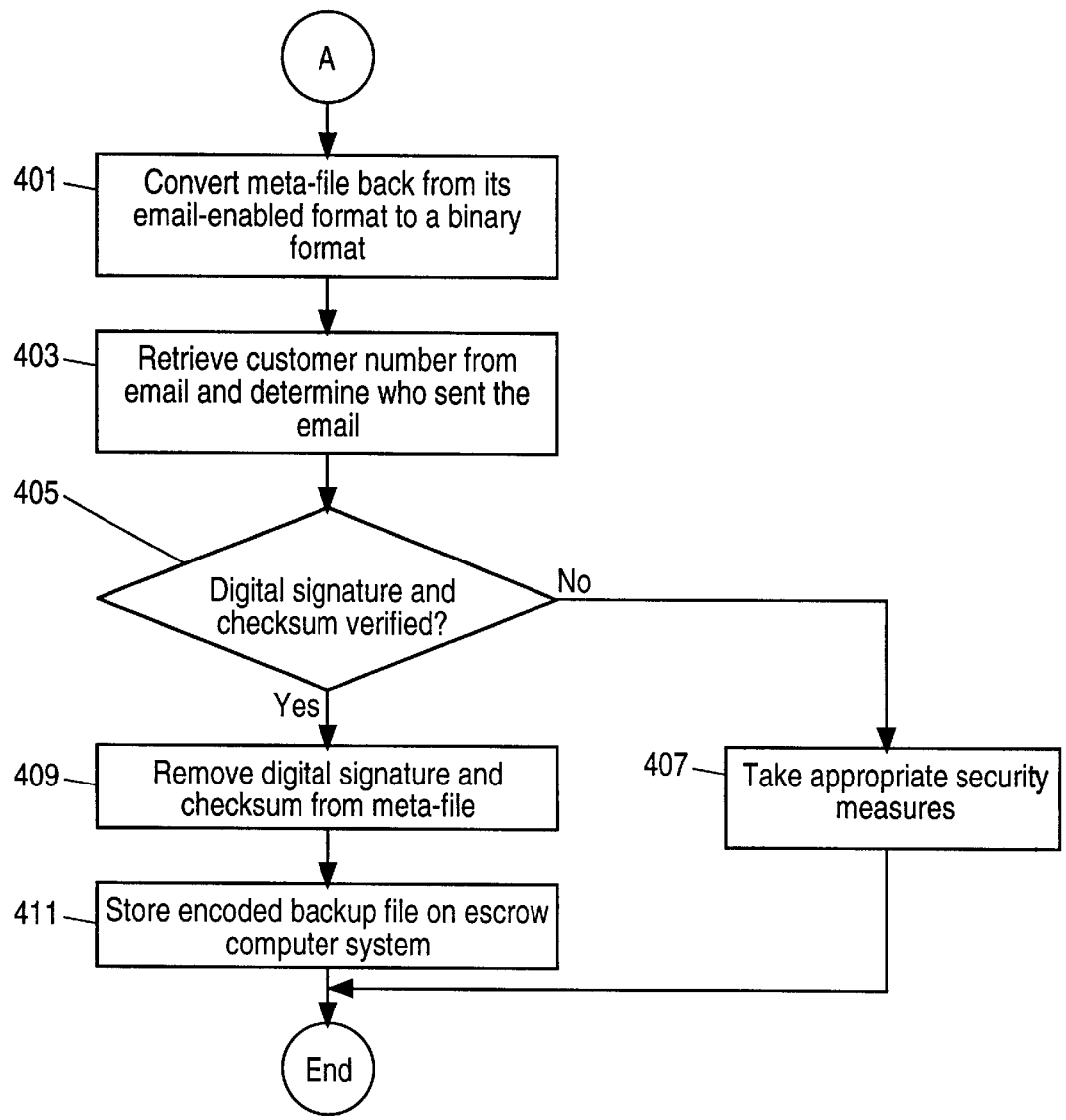
FIG. 4 is a flow diagram of the preferred steps of the method for processing the converted meta-file to ensure adequate storage of the client company's data.

FIG. 4 is a flow diagram of the preferred steps of the method for processing the converted meta-file to ensure adequate storage of the client company's data. In step 401 the method converts the meta-file from its "email-enabled" format into its binary format, preferably using the uuencode command. In step 402 the method retrieves from the email, a unique identifier, such as a number, for the client company. In the preferred embodiment a customer number is stored in the "Subject" line of the email. The escrow computer uses the retrieved customer number as a key into database 170 to determine the host company and the client company that sent the email. The escrow computer also updates the database accordingly, to indicate that an email has been received.

In step 405 the method retrieves the digital signature and the checksum from the meta-file and, using the host company's public key stored in the escrow company's database, verifies the digital signature. The method also performs a checksum operation on the encrypted client data and compares the result with the checksum result retrieved from the meta-file. If the digital signature and checksum are not verified then appropriate security measures are initiated in step 407. If the digital signature and checksum are verified then, in step 409, the digital signature and the checksum are removed from the meta-file. In step 411 the method stores the encoded client data at the escrow computer system. In the preferred embodiment, the escrow computer is unable to decrypt the client's data because the escrow computer does not have access to the client computer's private key. Thus, the client company is ensured of an added level of security because only the client company has access to the client company's private key. Upon completion of step 411, processing ends in the method of FIG. 4.

Figure 5:
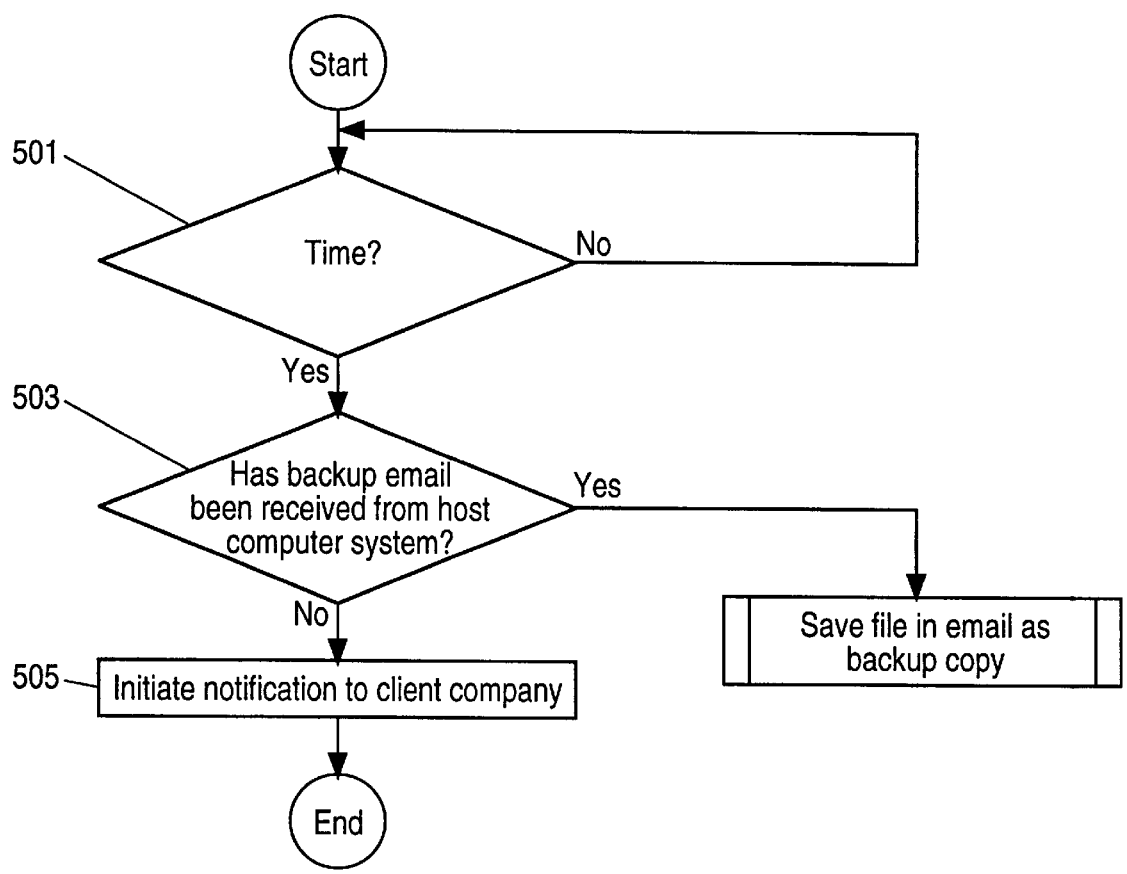
FIG. 5 is a flow diagram that illustrates the preferred steps of a method to ensure that the host computer is sending backup copies of the client's data to the escrow computer on a timely basis.

FIG. 5 is a flow diagram that illustrates the preferred steps of a method to ensure that the host computer is sending backup copies of the client's data to the escrow computer on a timely basis. In step 501 the method examines data, preferably stored in the cron file on the host computer, to determine whether it is time for the email of the client's data from the host computer. If it is not yet time, the method cycles back to step 501. If it is time for the email to arrive then in step 503 the method checks to determines whether the email has arrived. If the email has not arrived then in step 505, the method initiates notification to the client company. In this way, the escrow company is able to notify the client company that its procedures are not being followed by the host company, which may indicate that events are occurring at the host company that may make the client's web site inaccessible to users. If the client company experiences problems with the host company, it contacts the escrow company to retrieve the latest copy of its stored data. At this point, the client company decodes the backup using its private key. Thus, until a problem occurs, the only thing the client company needs to know is that it has an encryption key which it needs to keep in a safe place. Returning to the discussion of step 503, if the email has arrived from the host computer the escrow company stores it as a backup copy of the client's data, preferably using the steps discussed above with respect to FIG. 4.

Figure 6:
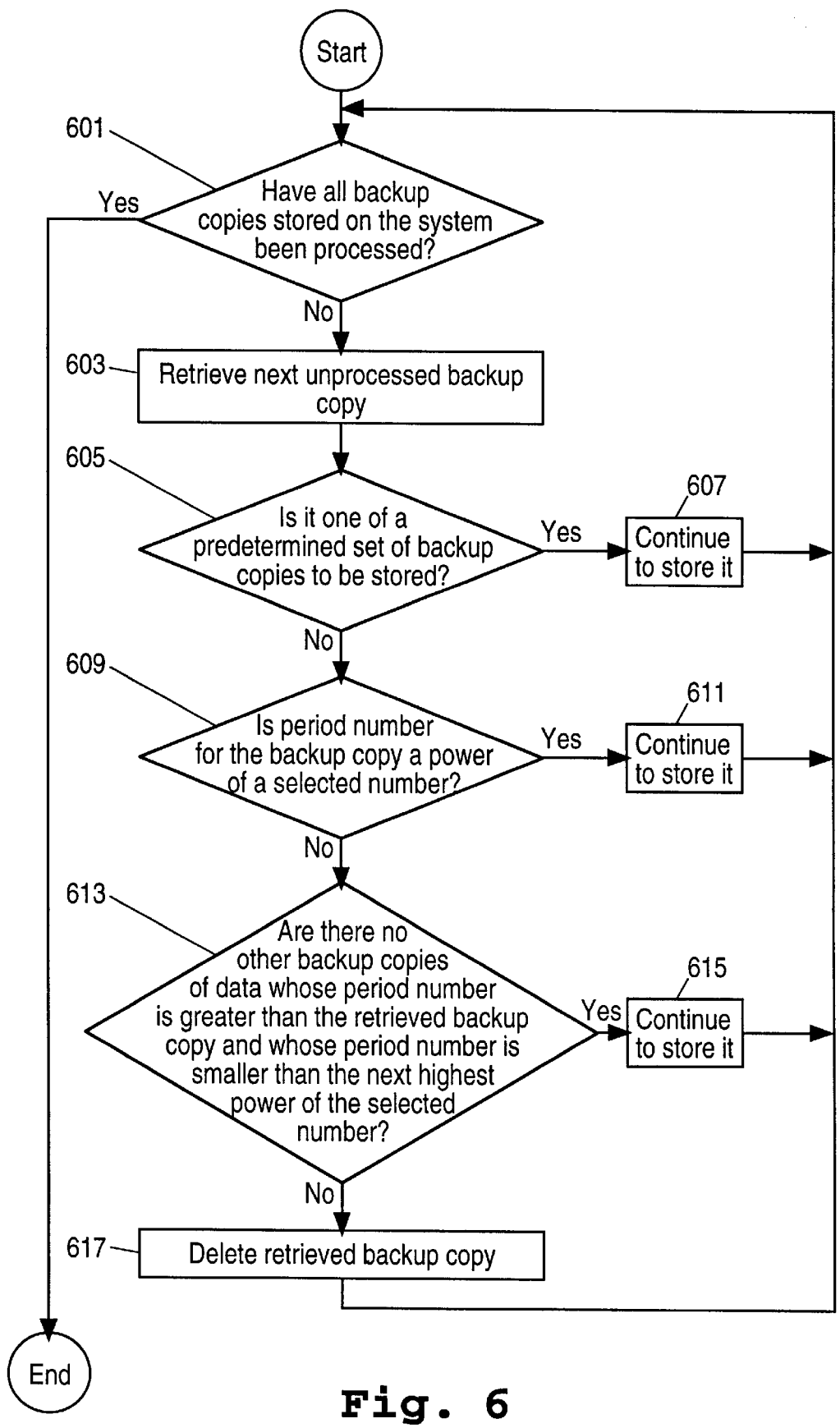
FIG. 6 illustrates the preferred steps of a method to save multiple backup copies of the client's data.

FIG. 6 illustrates the preferred steps of a method to save multiple backup copies of the client's data. The escrow computer saves multiple backup copies of the client's data because the host computer company may begin to send corrupted copies of the client's data before it reaches a situation (e.g., through bankruptcy) where the client's data is completely inaccessible to the client company and its users.

In step 601, the method determines whether all the backup copies of data which it currently stores on its system have been processed by this method. If backup copies remain which have not been processed then in step 603 the method retrieves the next unprocessed backup copy. The method preferably keeps the last three backup copies of data (steps 605 and 607). Backups that are more than three backup periods old are preferably treated as follows: if the backup period for the file is a power of two (e.g, 4, 8, 16, etc.), then it is kept (steps 609 and 611). If the backup period is not a power of two then the file is kept if there are no other files stored with a period number greater than the file in question but smaller than the next higher power of two (steps 613 and 615), else it is discarded (step 617). Thus, if the file being considered is 6 backup periods old, it will be deleted if there is a file that is 7 periods old and kept if there is no such file. This approach ensures that there are always backup files available to restore past system states, though progressively fewer files are kept for older states (that are less likely to need to be restored exactly). Steps 603, 605, 607, 609, 611, 613, 615, and 617, are performed until all backup copies have been processed, at which point processing ends in the method of FIG. 6.

While specific embodiments have been described herein for purposes of illustration, various modifications may be made without departing from the spirit and scope of the invention. For example, while the escrow computer described above has been associated with an "escrow" company independent of the host company and the client company, those of ordinary skill will understand that the functions of the escrow company could be performed by the client company instead. Accordingly, the invention is not limited to the above described embodiments, but instead is defined by the appended claims in light of their full scope of equivalents.

What is claimed is:

1. A method executed in a computer system for deleting old backup copies of data stored for the client company, wherein a backup copy of data stores data for a given backup period of time, and wherein each period of time is associated with a period number, the method including the steps of:

storing a predetermined number of backup copies of data for the client company; and for each backup copy of data which is not one of the predetermined number of backup copies of data, when the period number for the backup copy of data is a power of a selected number, the backup copy continues to be stored; and when the period number for the backup copy is not a power of the selected number, then the current backup copy of data continues to be stored for the client company if there are no other backup copies of data whose period number is greater than the period number of the backup copy but smaller than the next highest power of the selected number.

2. A computer program product executed in a computer system for deleting old backup copies of data stored for the client company, wherein a backup copy of data stores data for a given backup period of time, and wherein each period of time is associated with a period number, the computer program product comprising a computer usable medium having computer readable code embodied therein, said computer readable code comprising:

code that stores a predetermined number of backup copies of data for the client company; and for each backup copy of data which is not one of the predetermined number of backup copies of data, code which determines that, when the period number for the backup copy of data is a power of a selected number, the backup copy continues to be stored; and code which determines that, when the period number for the backup copy is not a power of the selected number, then the current backup copy of data continues to be stored for the client company if there are no other backup copies of data whose period number is greater than the period number of the backup copy but smaller than the next highest power of the selected number.

3. A computer system for deleting old backup copies of data stored for the client company, wherein a backup copy of data stores data for a given backup period of time, and wherein each period of time is associated with a period number, the computer system comprising:

a mechanism configured to store a predetermined number of backup copies of data for the client company; and for each backup copy of data which is not one of the predetermined number of backup copies of data, a mechanism configured such that when the period number for the backup copy of data is a power of a selected number, the backup copy continues to be stored; and a mechanism configured such that, when the period number for the backup copy is not a power of the selected number, then the current backup copy of data continues to be stored for the client company if there are no other backup copies of data whose period number is greater than the period number of the backup copy but smaller than the next highest power of the selected number.

\* \* \* \* \*